Patented May 10, 1927.

1,628,423

UNITED STATES PATENT OFFICE.

MAX G. PAULUS, OF CASPER, WYOMING, ASSIGNOR TO STANDARD OIL COMPANY, OF WHITING, INDIANA, A CORPORATION OF INDIANA.

ART OF SWEETENING HYDROCARBON OILS.

No Drawing.  Application filed May 28, 1925. Serial No. 33,501.

The present invention relates to improvements in methods of sweetening hydrocarbon oil products and more particularly products of the nature of gasoline and kerosene.

In accordance with the present invention, the oil to be sweetened, for example, a gasoline, is initially treated with hydrogen sulfide, to effect the solution in the oil of the desired quantity, as hereinafter more fully pointed out. The hydrogen sulfide may be supplied in the form of the pure gas, or by forcing through the gasoline a hydrocarbon gas containing considerable proportions of hydrogen sulfide; for example, still gases containing hydrogen sulfide obtainable in refineries in which certain types of crude oils are refined, such as the oils obtained in Wyoming. After the required amount of hydrogen sulfide gas has been absorbed by the gasoline or other oil to be treated, the necessary amount of doctor or sodium plumbite solution is added for the sweetening reaction. The treated oil is then separated from the resulting precipitate, and is found to be both sweet and non-corrosive, as indicated by the doctor and copper strip tests.

The amount of hydrogen sulfide gas required in the operation is readily determined by experiment. Samples of the gasoline or other oil to be treated are caused to dissolve varying amounts of hydrogen sulfide gas, the samples are then treated with doctor solution in the usual manner, and tests run upon the resulting products indicate the proper proportion of hydrogen sulfide gas required for the particular oil. Thus, for gasolines from certain Wyoming oils, it was found that the proportion of hydrogen sulfide gas required varied from 0.0008 to 0.001% by weight (48.3 to 60 cubic inches of hydrogen sulfide gas at 60° F. and 635 mm. pressure per barrel of gasoline).

In the practical operation of the process, still gases containing hydrogen sulfide are pumped in measured quantities into intimate contact with the gasoline to be treated, preferably in a continuous operation, as in absorber towers. The treated gasoline is then run into a suitable treating apparatus, preferably of the continuous type, for treatment with doctor or sodium plumbite solution in the usual manner.

I claim:

1. The method of treating sour light hydrocarbon oils, which comprises passing still gases containing hydrogen sulfide in intimate contact therewith, thereby effecting the solution of hydrogen sulfide in said oil, and subsequently subjecting the oil to the action of doctor solution.

2. The method of treating hydrocarbon oils comprising passing hydrocarbon gases containing hydrogen sulfide in intimate contact with said oils to effect the solution therein of 0.0008 to 0.001% of hydrogen sulfide, and subsequently subjecting the oil to the action of doctor solution.

MAX G. PAULUS.